United States Patent [19]

Petty

[11] Patent Number: 5,363,443
[45] Date of Patent: Nov. 8, 1994

[54] DIFFERING FREQUENCY SINE WAVE GENERATION FROM A LOOK-UP TABLE

[75] Inventor: Norman W. Petty, Boulder, Colo.

[73] Assignee: AT&T Bell Laboratories, Murray Hill, N.J.

[21] Appl. No.: 163,968

[22] Filed: Dec. 8, 1993

[51] Int. Cl.⁵ .............................................. H04M 3/00
[52] U.S. Cl. .................................... 379/418; 379/361; 379/355; 379/97; 379/98; 84/600; 84/605; 84/607; 84/615
[58] Field of Search ................. 379/418, 361, 355, 97, 379/98; 84/600, 601, 602, 603, 604, 605, 606, 607, 615

[56] References Cited

U.S. PATENT DOCUMENTS

| | | | |
|---|---|---|---|
| 5,034,977 | 7/1991 | Chen et al. | 379/418 |
| 5,086,475 | 2/1992 | Kutaragi et al. | 84/603 |
| 5,208,852 | 5/1993 | Tamura et al. | 379/418 |

OTHER PUBLICATIONS

Bresenham Line Drawing Algorithm, Newman and Sproull, *Principles of Literature Computer Graphics*, McGraw Hill, 2nd Edition, 1979.
Computer Music Journal, J. Gold 1975 vol. I, No. 2. pp. 4–7 CA, 94025 Apr. 1975.

*Primary Examiner*—James L. Dwyer
*Assistant Examiner*—Jacques M. Saint-Surin

[57] ABSTRACT

Sine waves are generated by a port circuit processor of a telephone switching office by accessing a look-up table stored in a memory associated with the port circuit processor. Entries in the look-up table are accessed by using table steps or Δ's which correspond to the frequencies of the sine waves to be generated. The table steps or Δ's are changed for different sine wave frequencies and may be changed each bit period. Whether changed or not, a first fractional portion of the table step or Δ for the previous frequency is combined with a second fractional portion of the table step or Δ for the current frequency with the first and second fractional portions adding up to one. In this way, an X sample per second data stream, X equaling the base sample rate of the look-up table, that precisely matches a Y bits per second rate, Y equaling the transmission rate of the data stream, is generated.

18 Claims, 3 Drawing Sheets

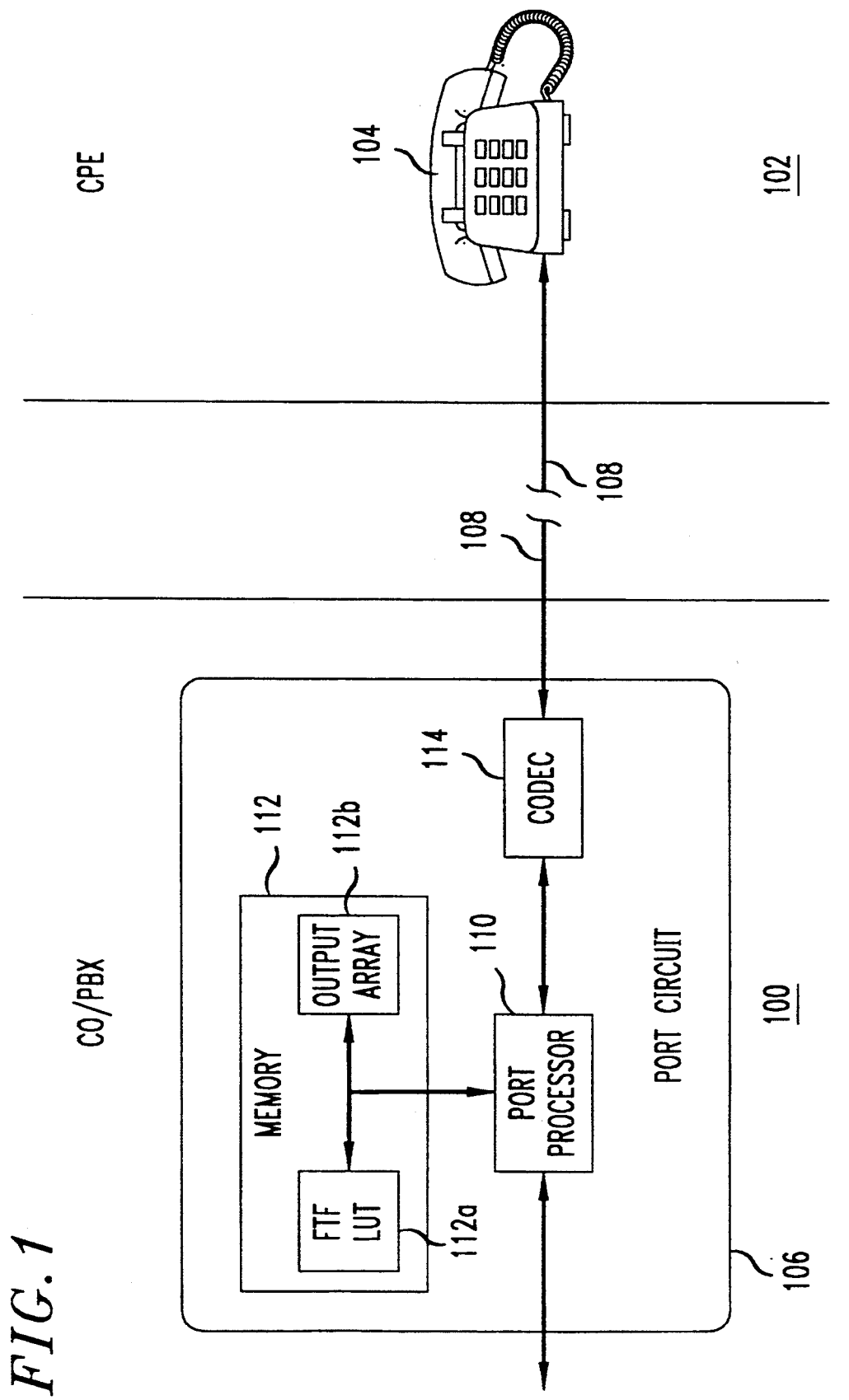

DIFFERING FREQUENCY SINE WAVE GENERATION FROM A LOOK-UP TABLE

BACKGROUND OF THE INVENTION

The present invention relates in general to the generation of sine waves of differing frequencies from a single look-up table and, more particularly, to methods of generating sine waves of differing frequencies from a single look-up table having entries including samples taken at a sampling frequency which is not an integer multiple of a frequency used for transmission of sine waves generated. While the present invention is generally applicable to sine wave generation, it is particularly applicable to the telecommunications industry and will be described herein with reference to a preliminary use of the invention for simplex voiceband digital interface (VDI-1) signaling.

Simplex voiceband digital interface (VDI-1) signaling is used to add features to analog lines served by local exchange company (LEC) central offices (CO's) and private branch exchanges (PBX's). For example, calling number delivery, calling name delivery and calling identity delivery can be provided to customer premises equipment (CPE) from a CO for call waiting by means of VDI-1 signaling. PBX uses of VDI-1 signaling include the control of message waiting lamps on analog lines of a PBX.

The transmission standard used for VDI-1 signaling is well known in the art and is described in AT&T Technical Description AT&T 533-099-002TD, which is incorporated herein by reference. Generally, phase-coherent frequency shift keying (FSK) is used for VDI-1 signaling to send logical ones or marks and logical zeroes or spaces at a 1200 bits per second rate using 1200 hertz and 2200 hertz signals, respectively.

In the prior art, FSK for VDI-1 signaling has required significant additional circuitry or hardware on port circuits used in a CO or PBX to service analog lines, adding substantially to the cost of the port circuits. For example, universal asynchronous receivers and transmitters (UART's) and voltage controlled oscillators (VCO's) or, more commonly, digital signal processors (DSP's) were added to port circuits for VDI-1 signalling services.

In a DSP based port board, a DSP is required in addition to a port circuit processor since a DSP can rapidly perform multiply and multiply-accumulate functions to quickly evaluate sine approximation polynomials, such as a fifth-order Taylor polynomial, to generate a sine wave of a desired frequency for the first quadrant. Trigonometric identities can then be applied to define sine wave values over an entire sine wave cycle, i.e., from 0 to $2\pi$. Such techniques can be used in a DSP for sine wave generation but not in a port circuit processor which cannot perform multiply and multiply-accumulate operations as rapidly.

If signal frequencies other than 1200 hertz and 2200 hertz are needed for analog services, such as 2130 hertz and 2750 hertz for call identity delivery for call waiting service, the other signal frequencies can be added to a DSP based port circuit by updating DSP firmware. Additional signaling frequencies would require a new hardware implementation for a UART/VC0 based port circuit.

Accordingly, a DSP based port circuit is preferred from a versatility standpoint. Unfortunately, if a DSP of a port circuit can not be shared over several ports or be used to perform other operations, such as touch tone ® signal detection, the cost of the DSP for providing VDI-1 signaling services may be prohibitively high.

Low distortion sine waves also can be produced quickly using a look-up table. A direct table look-up can be implemented if the frequencies of the wave forms to be generated are integer multiples of a fundamental table frequency (FTF) such that all required samples are contained within the table and no interpolation is required. If the frequencies of the sine waves to be generated are not integer multiples of the FTF, interpolation is required to minimize harmonic distortion.

Accordingly, a direct table look-up can be implemented to generate a sine wave of frequency f using no multiply or divide operations where a table step $\Delta$ is used to index into the table where $\Delta = f/FTF$. FSK signals can then be generated by selecting $\Delta$'s corresponding to the frequencies to be generated.

Unfortunately, a problem arises in some application because the sampling frequency is not an integer multiple of a frequency used for transmission of sine waves generated. For example, in VDI-1 FSK signal generation, the sample rate is 8000 samples per second while the transmission rate is 1200 bits per second. This gives 6 and $\frac{2}{3}$ samples per bit period. The table step $\Delta$ may be changed every bit period if logical ones and zeroes are alternated in a VDI-1 message.

Such alternation results in a three bit period cycle of 6 samples of one bit frequency followed by 7 samples of the next bit frequency followed by 7 samples of the next bit frequency. This cycle may be repeated until a message is completed. To represent a true 1200 bits per second rate, a correction must also be applied for the "fractional" samples or samples which interface between the first and second bit frequencies, and samples which interface between the second and third bit frequencies. Such corrections and/or interpolations substantially detract from the use of look-up tables for these applications.

Thus, there is a need for an inexpensive port circuit which offers the versatility of a DSP based port circuit without the inherent costs of the DSP to satisfy current and on-going signaling needs for services provided to analog lines using VDI-1 signaling. Preferably, the port circuit would provide all current signaling requirements while permitting convenient adaptations for future signaling needs without requiring revision of the port circuit hardware or the inclusion of a DSP.

SUMMARY OF THE INVENTION

This need is met by the methods of the invention of the present application wherein sine waves are generated by a port circuit processor by accessing a look-up table stored in a memory associated with the port circuit processor. Entries in the lookup table are accessed by using table steps or $\Delta$'s which correspond to the frequencies of the sine waves to be generated. The table steps or $\Delta$'s are changed for different sine wave frequencies and may be changed each bit period. Whether changed or not, a first fractional portion of the table step or $\Delta$ for the last frequency is combined with a second fractional portion of the table step or $\Delta$ for the current frequency with the first and second fractional portions adding up to one. In this way, an X sample per second data stream, X equaling the base sample rate of the look-up table, that precisely matches a Y bits per second rate, Y equaling the transmission rate of the data stream, is created.

In accordance with one aspect of the present invention, a method for generating at least two different frequency sine waves for transmission at a first frequency from a look-up table having entries including samples taken at a second sampling frequency which is not an integral multiple of the first frequency comprises the steps of: selecting a fundamental table frequency such that the frequencies of the different frequency sine waves to be generated are each an integral multiple of the fundamental table frequency; determining a fractional correction factor by placing the second sampling frequency over the first frequency to form a fraction, and reducing the fraction; forming a look-up table for a sine wave of the fundamental table frequency by taking samples at a rate equal to the second sampling frequency times a denominator of the fractional correction factor; accessing the look-up table using at least two different table steps corresponding to the at least two different frequency sine waves to be generated; and, taking first and second fractional portions of two different table steps for transitions between corresponding first and second frequency sine waves, the first and second fractional portions summing to one.

In accordance with another aspect of the present invention, a method for generating at least two different frequency sine waves for transmission at a first frequency from a look-up table having entries including samples taken at a second sampling frequency which is not an integral multiple of the first frequency comprises the steps of: selecting a fundamental table frequency such that the frequencies of the different frequency sine waves to be generated are each an integral multiple of the fundamental table frequency; determining a fractional correction factor by: placing the second sampling frequency over the first frequency to form a fraction, and reducing the fraction; determining a new fundamental table frequency by multiplying the fundamental table frequency by the denominator of the fractional correction factor; forming a look-up table for a sine wave of the new fundamental table frequency by taking samples at a rate equal to the second sampling frequency; determining at least two different table steps corresponding to the at least two different frequency sine waves to be generated; accessing the look-up table using the at least two different table steps; and, taking first and second fractional portions of two different table steps for transitions between corresponding first and second frequency sine waves, the first and second fractional portions summing to one.

In accordance with yet another aspect of the present invention, a method for generating at least two different frequency sine waves for transmission at a first frequency from a look-up table having entries including samples taken at a second sampling frequency which is not an integral multiple of the first frequency comprises the steps of: selecting a fundamental table frequency such that the frequencies of the different frequency sine waves to be generated are each an integral multiple of the fundamental table frequency; determining a fractional correction factor by: placing the second sampling frequency over the first frequency to form a fraction, and reducing the fraction; forming a look-up table for a sine wave of the fundamental table frequency by taking samples at a rate equal to the second sampling frequency times a denominator of the fractional correction factor; accessing the look-up table using at least two different table steps corresponding to the at least two different frequency sine waves to be generated; and, taking first and second fractional portions of two table steps occurring on either side of transmission transition points defined by the first frequency, the first and second fractional portions summing to one.

The methods may further comprise the steps of: determining a new fundamental table frequency by multiplying the fundamental table frequency by the denominator of the fractional correction factor; and, determining the at least two different table steps based on the new fundamental table frequency, preferably by dividing frequencies of the at least two different frequency sine waves by the new fundamental table frequency. To conserve memory space used by the method, the method may further comprise the steps of: limiting the look-up table to samples corresponding to one sine wave of the fundamental table frequency; and, circulating the step of accessing the look-up table to maintain accesses within the look-up table. In one specific illustrative embodiment of the present invention, the method further comprises the steps of: setting the first frequency to 1200 hertz; and, setting the second sampling frequency to 8000 hertz. In this illustrative embodiment, the method may further comprise the steps of: setting a first table step of 18 for a sine wave of 1200 hertz; and, setting a second table step of 33 for a sine wave of 2200 hertz.

It is thus an object of the present invention to generate sine waves of differing frequencies from a single look-up table having entries including samples taken at a sampling frequency which is not an integer multiple of a frequency used for transmission of sine waves generated; and, to generate sine waves of differing frequencies from a single look-up table having entries including samples taken at a sampling frequency which is not an integer multiple of a frequency used for transmission of sine waves generated by accessing the look-up table by using table steps or $\Delta$'s which correspond to the frequencies of the sine waves to be generated with fractional portions of data steps on either side of a bit period transition being combined for each bit period transition.

Other objects and advantages of the invention will be apparent from the following description, the accompanying drawings and the appended claims.

BRIEF DESCRIPTION OF THE DRAWINGS

FIG. 1 is a schematic block diagram showing a telecommunications environment for which the sine wave generation of the present application is particularly applicable;

DETAILED DESCRIPTION OF THE INVENTION

Figure 3:
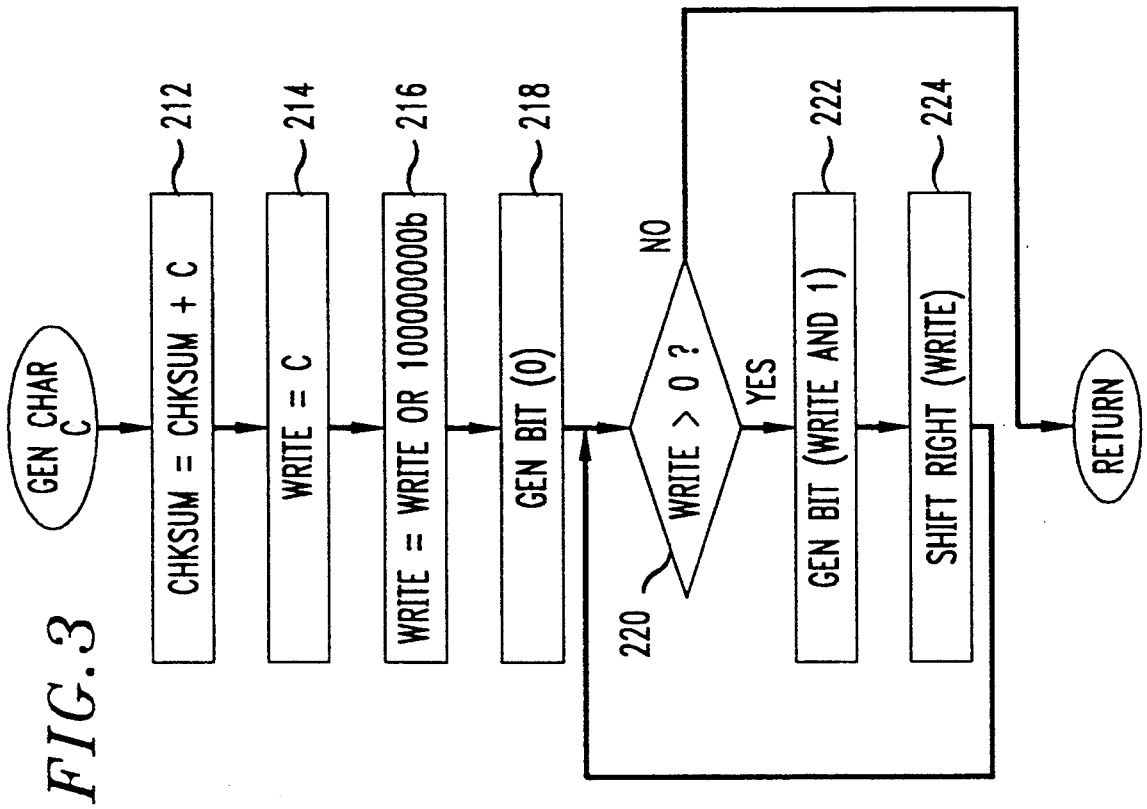
FIG. 3 is a flow chart for assembly of a character of a VDI-1 message incorporating the methods of the present invention.

The invention of the present application will now be described with reference to the drawing figures. While the present invention is generally applicable to sine wave generation, it is particularly applicable to the telecommunications industry and will be described herein with reference to a preliminary use of the invention for simplex voiceband digital interface (VDI-1) signaling.

Simplex voiceband digital interface (VDI-1) signaling is used to add features to analog lines served by local exchange company (LEC) central offices (CO's) and private branch exchanges (PBX's). For example, calling number delivery, calling name delivery and calling identity delivery can be provided to customer premises equipment (CPE) from a CO for call waiting by means of VDI-1 signaling. PBX uses of VDI-1 signaling include the control of message waiting lamps on analog lines of a PBX.

FIG. 1 is a schematic block diagram showing a telecommunications environment including a telephone switching facility 100 and connected customer premises equipment (CPE) 102 comprising, as illustrated in FIG. 1, a telephone 104 including equipment capable of receiving VDI-1 signals. The telephone switching facility 100 may be an LEC CO or a PBX.

The switching facility 100 includes a port circuit 106 for interfacing the outside plant 108 and CPE 102 to the switching facility 100. The port circuit 106 includes a port processor 110 and an associated memory 112 which includes two memory blocks: a first memory block contains a look-up table 112a for a sine wave of the fundamental table frequency, FTF LUT, and a second memory block contains an output array 112b for accumulating samples from the look-up table 112a to define sine waves, OUTPUT ARRAY. The functions of the look-up table 112a and output array 112b will be fully described with reference to FIGS. 2–4. A coder-decoder (CODEC) 114 includes analog-to-digital (A/D) and digital-to-analog (D/A) circuitry for converting analog line signals to digital office signals and digital office signals to analog line signals, respectively.

To avoid the costs of either a digital signal processor (DSP) or a universal asynchronous receiver transmitter (UART) and a voltage controlled oscillator (VCO), the port processor 110 utilizes the invention of the present application to generate sine waves for VDI-1 signaling. Low distortion sine waves can be produced quickly using a look-up table. The values used for S approximating a sine wave are stored in a memory where:

$$\sin (x) = \text{SIN\_TABLE} [2\pi x/N]$$

where N is the number of values required to store one complete sine wave (0 to $2\pi$).

A direct table look-up can be implemented if the generated sine wave frequencies are integer multiples of the frequency of the look-up table sine wave, the fundamental table frequency (FTF). For these cases, all the required samples are contained within the table and no interpolation is necessary.

If the frequencies of sine waves to be generated are not integer multiples of the fundamental table frequency (FTF), interpolation is required to minimize the total harmonic distortion of the generated sine waves. For telecommunications applications, the table values are normally stored in a conventional nonlinear PCM format using A-law PCM or μ-law PCM to avoid conversion from a linear format to the nonlinear PCM format for values read from the table. However, to accommodate linear interpolation, the table values are stored in linear form and, for telecommunications applications, values read from the table are converted from their linear form to nonlinear PCM.

General purpose processors and controllers, such as the port processor 110, are not well suited to calculate sine waves using a polynomial expansion because they perform multiplication and division slowly. However, a table look-up process is ideal for such processors and controllers because it can be implemented using no multiplies or divides. A table step $\Delta$ is computed to index into the table, i.e. the table step or index determines which samples are read from the table such that for a table step $\Delta = 6$, every sixth sample is read from the table. The table step or $\Delta$ is computed by taking the desired frequency f and dividing it by FTF such that table step $\Delta = f/\text{FTF}$. For example, if the sample rate is 8000 Hz, the FTF is 200 Hz and the desired frequency is 1200 Hz, then $\Delta = 1200/200 = 6$ in a table of $8000/200 = 40$ samples. If the desired frequency is 2200 Hz under the above conditions then $\Delta = 2200/200 = 11$.

The look-up table contains samples for one complete sine wave and, to keep the index within the table, the table size is subtracted from the computed table index whenever the table index exceeds the table size.

A direct table look-up for implementing frequency shift keying (FSK) is easily performed if the sample rate of table entries is an integral multiple of the transmission rate for the FSK signals and the FSK frequencies are integral multiples of the FTF. FSK signals are generated by selecting a table step $\Delta$, at the transmission rate, to compute the table index such that all frequency changes occur at sample points within the look-up table.

The problem in VDI-1 FSK signal generation is that the sample rate is 8000 PCM samples per second and the transmission rate is 1200 bits per second. Thus, 8000/1200 gives 6 and ⅔ (20/3) PCM samples per FSK bit period. The table step a for indexing into the look-up table may be changed every bit period in a VDI-1 message if the message contains alternating logical ones (1's) and zeroes (0's). Such alternation for a three bit period results in a three bit period cycle of 6 PCM samples of the first bit frequency followed by 7 PCM samples of the second bit frequency followed by 7 PCM samples of the third bit frequency. This cycle is then repeated until the VDI-1 message is complete. Unfortunately, to represent a true 1200 bit per second transmission rate, correction must be made for the fractional samples and processing such a correction as conventionally performed substantially eliminates the time benefits of using the table look-up process.

The invention of the present application provides a general purpose direct table look-up process for generating sine waves from a look-up table wherein the sample rate is not an integral multiple of the transmission rate for the generated sine waves. While being generally applicable for such conditions, it will be described herein as applied to VDI-1 FSK signaling.

A Fundamental Table Frequency (FTF) is chosen so that the FSK frequencies are integral multiples of the FTF. For the illustrated VDI-1 signaling embodiment frequencies, 1200 hertz and 2200 hertz, a FTF of 200 hertz is chosen. A fractional correction factor (FCF) is computed by placing the sample rate (SR) over the transmission rate (TR). For VDI-1, $\text{FCF} = \text{SR}/\text{MR} = 8000/1200 = 20/3 = N/D$.

To eliminate fractional operations and thereby eliminate divide instructions and interpolations from the table look-up process of the present application, a New Fundamental Table Frequency (NFTF) is determined by dividing the FTF by the denominator D of the FCF. This requires the look-up table to be D or 3 times as large as a direct look-up table for the FTF and accommodates the direct look-up of fractional sample steps.

That is, full table steps or $\Delta$'s for accessing the look-up table are now D or 3 times the size of corresponding full table steps or $\Delta$'s for a direct look-up table for the FTF and fractional table steps can be made directly to table entries which are entered between the samples for the full table steps. For the illustrated embodiment of sine wave generation for VDI-1 signaling, the NFTF=FTF/3=200/3. This table is identical to a 200 hertz table which is sampled at 3 times the normal sampling rate. Table steps or $\Delta$'s for the frequencies of the sine waves to be generated are then computed based on the NFTF.

For the illustrated embodiment of sine wave generation for VDI-1 signaling, the full table step or $\Delta$ for 1200 Hz is calculated by dividing the NFTF 200/3 into 1200: 1200/(200/3)=18; and, the full table step or $\Delta$ for 2200 Hz is calculated by dividing the NFTF 200/3 into 2200: 2200/(200/3)=33.

It should be apparent that the full table steps can also be calculated from the table steps calculated using the FTF by multiplying by D or 3. Thus, the table steps for a direct look-up table of FTF would be: $\underline{\Delta}$ for 1200 Hz is calculated by dividing the FTF 200 into 1200: $\underline{\Delta}$=1200/200=6 such that $\Delta$=6*3=18; and, $\underline{\Delta}$ for 2200 Hz is calculated by dividing the FTF 200 into 2200: $\underline{\Delta}$=2200/200=11 such that $\Delta$=11*3=33.

Figure 2:
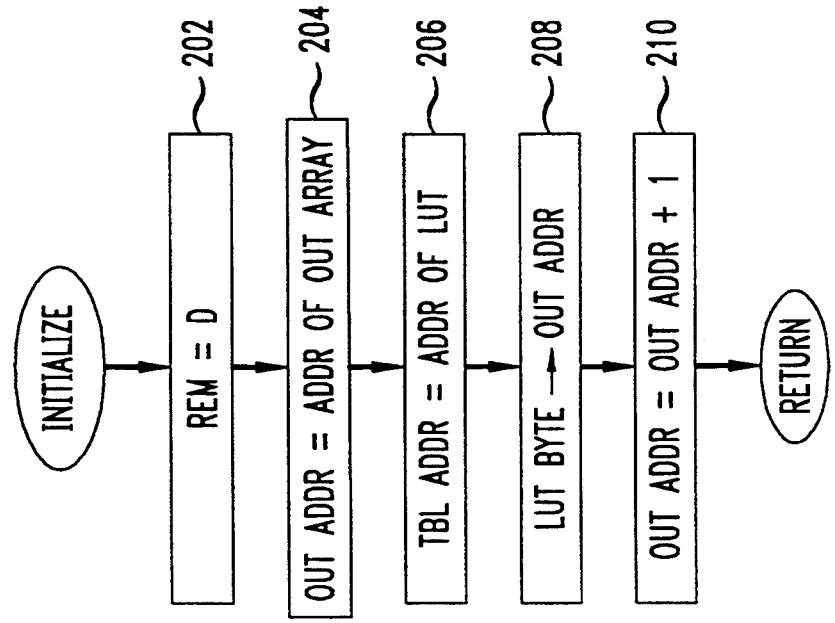
FIG. 2 is a flow chart for initialization of a process for generating sine waves using a look-up table in accordance with the present invention.
Figure 4:
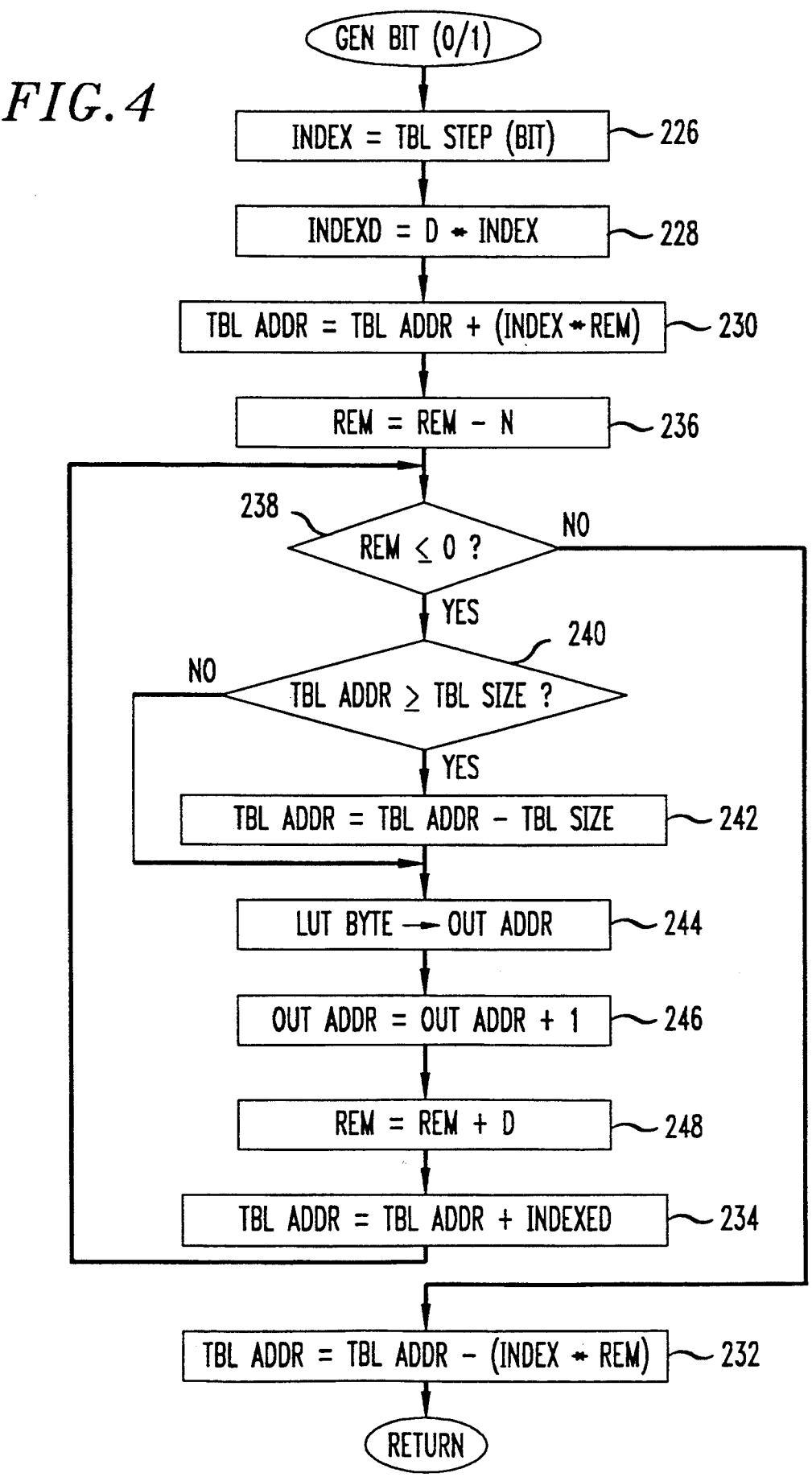
FIG. 4 is a flow chart for generating samples for one transmission bit period including correction for fractional samples resulting from using a sampling frequency which is not an integer multiple of a transmission frequency for generated sine waves.

Prior to performing the operations set forth in the flow chart of FIG. 4 for generating samples of a given frequency for one transmission bit period, initialization is performed using the process of FIG. 2. A global integer REM is used to keep track of fractional samples and is initialized by setting REM equal to the denominator D of the fractional correction factor (FCF), for the illustrated embodiment, REM=D=3, see block 202.

A byte pointer OUT ADDR is set to point to the address of the output array 112b, see FIG. 1, which is the next output byte to be determined, and a byte pointer TBL ADDR points to the address of the next PCM sample in the look-up table 112a which is to be read, see blocks 204, 206. For initialization, OUT ADDR points to the first address of the output array 112b and the TBL ADDR points to the first entry in the look-up table 112a. In block 208, the PCM sample of the first address of the look-up table 112a is loaded into the first address of the output array 112b. In block 210, the OUT ADDR pointer is incremented by 1 to point to the next address of the output array 112b for which a PCM sample from the look-up table 112a is to be loaded.

As is well known in the art and as fully described in previously referenced AT&T Technical Description AT&T 533-099-002TD, in VDI-1 messages, information bits are grouped into 8 bit characters preceded by a logical zero (0) start bit and followed by a logical one (1) stop bit. Information bits are sent in order, least significant bit first. Each VDI-1 message is formatted to include a number of control signals prior to information to be transmitted and an 8 bit check sum word following the information.

After the initialization process illustrated in FIG. 2, a character generator process, GEN CHAR C, illustrated by the flow chart of FIG. 3 is performed to generate a sequence of tones for an 8-bit character c. This process is repeated until all characters of a VDI-1 message have been assembled in the output array 112b. The contents of the output array 112b are then transmitted to the CODEC 114 by the port processor 110 and ultimately to the telephone 104 representing the CPE 102.

The GEN CHAR C process generates the tone sequence for a character C. In block 212, the process first adds the character C to the global byte CHKSUM, which is the check sum word of the last byte in the VDI-1 message previously described. Block 214 sets a 16 bit local integer variable WRITE to the value of the character C and block 216 sets the 9th bit in WRITE (used as the stop bit) to a logical one (1). Block 218 calls a bit generate process, GEN BIT (0/1), illustrated in FIG. 4 with a logical zero (0) to generate one bit period of logical zero (0) for the start bit.

The remaining 8 information bits (least significant bit first) followed by the single stop bit are then generated. Decision block 220 continues the tone sequence generation until WRITE is zero, i.e., the stop bit has been generated. The block 222 calls the bit generate process, GEN BIT (0/1), to generate the least significant bit in WRITE. The block 224 shifts WRITE one bit position to the right so that the next significant bit can be generated.

The bit generate process, GEN BIT (0/1), of FIG. 4 generates a one bit period waveform for a selected parameter, 20/3 PCM samples per bit period. In the illustrated embodiment, the parameter is a single bit corresponding to the two FSK frequencies used for VDI-1 signaling: 2200 hertz (0) and 1200 hertz (1). The bit generate process also corrects for all fractional samples which result from transitions between the frequencies which are generated, in the illustrated embodiment transitions between the two frequencies 2200 hertz and 1200 hertz.

Referring to FIG. 4, the block 226 sets a local integer variable INDEX, which is used for fractional sample correction to one of the table steps or $\underline{\Delta}$'s for indexing in a direct look-up table for the fundamental table frequency ([T[), i.e., logical zero (0), 2200 hertz=11 table steps and logical one (1), 1200 hertz=6 table steps. Block 228 sets a local integer variable INDEXD, which is used as the table step $\Delta$ into the look-up table 112a, FTF LUT, constructed using the new fundamental table frequency (NFTF), to D times the value of INDEX.

Block 230 provides fractional sample correction for the current bit frequency by indexing into the table by a fractional portion of a table step for the current bit frequency, i.e. taking a fractional portion of the table step $\Delta$ for the current frequency to define a first fractional table step $\Delta$ equal to INDEX times REM; and block 232 (in combination with block 234) provides fractional sample correction for the previous bit frequency by indexing into the table by a fractional portion of a table step for the previous bit frequency, i.e. taking a fractional portion of the table step $\Delta$ for the previous frequency to define a second fractional table step $\Delta$ equal to the table step $\Delta$ for the previous frequency less INDEX times REM. For VDI-1 signaling, fractional sample correction consists of the following 3 cases:

0/3 Fractional portion of the table step for the previous frequency+3/3 fractional portion of the table step for the current frequency;

$\frac{1}{3}$ fractional portion of the table step for the previous frequency+$\frac{2}{3}$ fractional portion of the table step for the current frequency; or ⅔ fractional portion of the table step for the previous frequency+⅓ fractional portion of the table step for the current frequency.

The global integer REM defines the numerator of the fractional sample correction for the current frequency fraction and D-REM is the numerator of the previous frequency fraction with D being the denominator for both fractions.

Thus, when bit generate process, GEN BIT (0/1) is exited via block 232 and re-entered via block 226, the table step which is taken comprises fractional portions of the sine wave frequency which was being generated and the sine wave frequency which is to be generated. For example, if a 1200 hertz sine wave was being generated (previous frequency), the table step was equal to 18 and, due to blocks 232, 234, some fraction (0/3, ⅓ or ⅔) of the table step was taken (0, 6 or 12). If a 2200 hertz sine wave is to be generated next (current frequency), the table step is equal to 33 and, due to block 230, some corresponding fraction (3/3, ⅔ or ⅓) of the table step is taken (33, 22 or 11). By thus combining the portions of the table steps of the two frequencies on either side of a transition to define a transitional table step, the total harmonic distortion of the generated sine waves is minimized.

If two consecutive bit periods of the same frequency are to be generated, it is apparent that the fractional correction process of FIG. 4 sets the table step Δ to the correct value. This process is performed by taking a first fractional portion of the table step Δ for the "previous frequency", (0/3, ⅓ or ⅔), to obtain a first fractional table step n and a complementary fractional portion of the "current frequency", (3/3, ⅔ or ⅓), to obtain a second fractional table step Δ. Since the previous and current frequencies are equal and the table steps are equal, the transitional table step is the same as the table step for the previous and current frequencies.

Block 236 makes REM negative by subtracting N, the numerator of the fractional correction factor (FCF), from REM. Blocks 238 through 248 perform direct table look-up operations for selecting PCM samples from the look-up table 112a for generation of sinewaves as long as REM is negative. Blocks 240 and 242 keep the bit generate process, GEN BIT (0/1), within the look-up table 112a by subtracting the table size, TBL SIZE, i.e. the size of the FTF LUT, from the TBL ADDR whenever the table address, TBL ADDR is greater than or equal to, ≧, the table size, TBL SIZE.

In block 244, the PCM sample of the current address (contained in the byte pointer LUT ADDR) of the look-up table 112a is loaded into the current address (contained in the byte pointer OUT ADDR) of the output array 112b. Block 246 updates the output address by incrementing the byte pointer OUT ADDR by 1. Block 246 updates REM for comparison with zero (0) in the decision block 238. Block 234 steps the byte pointer TBL ADDR one full table step Δ into the look-up table 112a. Thus, by stepping or advancing one full table step Δ in the block 234 and stepping back by the fractional portion of a full table step Δ in the block 232, the required fractional sample correction for the current bit frequency is obtained.

Having thus described the methods of the present invention in detail and by reference to preferred embodiments thereof, it will be apparent that modifications and variations are possible without departing from the scope of the invention defined in the appended claims.

What is claimed is:

1. A method for generating at least two different frequency sine waves for transmission at a first frequency from a look-up table having entries including samples taken at a second sampling frequency which is not an integral multiple of said first frequency, said method comprising the steps of:
    selecting a fundamental table frequency such that the frequencies of said different frequency sine waves to be generated are each an integral multiple of said fundamental table frequency;
    determining a fractional correction factor by:
        placing said second sampling frequency over said first frequency to form a fraction; and
        reducing said fraction;
    forming a look-up table for a sine wave of said fundamental table frequency by taking samples at a rate equal to said second sampling frequency times a denominator of said fractional correction factor;
    accessing said look-up table using at least two different table steps corresponding to said at least two different frequency sine waves to be generated; and
    taking first and second fractional portions of two different table steps for transitions between corresponding first and second frequency sine waves, said first and second fractional portions summing to one.

2. A method for generating at least two different frequency sine waves as claimed in claim 1 further comprising the steps of:
    determining a new fundamental table frequency by multiplying said fundamental table frequency by said denominator of said fractional correction factor; and
    determining said at least two different table steps based on said new fundamental table frequency.

3. A method for generating at least two different frequency sine waves as claimed in claim 2 wherein said step of determining said at least two different table steps comprises the step of dividing frequencies of said at least two different frequency sine waves by said new fundamental table frequency.

4. A method for generating at least two different frequency sine waves as claimed in claim 1 further comprising the steps of:
    limiting said look-up table to samples corresponding to one sine wave of said fundamental table frequency; and
    circulating said step of accessing said look-up table to maintain accesses within said look-up table.

5. A method for generating at least two different frequency sine waves as claimed in claim 1 further comprising the steps of:
    setting said first frequency to 1200 hertz; and
    setting said second sampling frequency to 8000 hertz.

6. A method for generating at least two different frequency sine waves as claimed in claim 5 further comprising the steps of:
    setting a first table step of 18 for a sine wave of 1200 hertz; and
    setting a second table step of 33 for a sine wave of 2200 hertz.

7. A method for generating at least two different frequency sine waves for transmission at a first frequency from a look-up table having entries including samples taken at a second sampling frequency which is not an integral multiple of said first frequency, said method comprising the steps of:

selecting a fundamental table frequency such that the frequencies of said different frequency sine waves to be generated are each an integral multiple of said fundamental table frequency;
determining a fractional correction factor by:
 placing said second sampling frequency over said first frequency to form a fraction; and
 reducing said fraction;
determining a new fundamental table frequency by multiplying said fundamental table frequency by said denominator of said fractional correction factor;
forming a look-up table for a sine wave of said new fundamental table frequency by taking samples at a rate equal to said second sampling frequency;
determining at least two different table steps corresponding to said at least two different frequency sine waves to be generated;
accessing said look-up table using said at least two different table steps; and
taking first and second fractional portions of two different table steps for transitions between corresponding first and second frequency sine waves, said first and second fractional portions summing to one.

8. A method for generating at least two different frequency sine waves as claimed in claim 7 wherein said step of determining at least two different table steps corresponding to said at least two different frequency sine waves to be generated is based on said new fundamental table frequency.

9. A method for generating at least two different frequency sine waves as claimed in claim 8 wherein said step of determining at least two different table steps comprises the step of dividing frequencies of said at least two different frequency sine waves by said new fundamental table frequency.

10. A method for generating at least two different frequency sine waves as claimed in claim 7 further comprising the steps of:
 limiting said look-up table to samples corresponding to one sine wave of said fundamental table frequency; and
 circulating said step of accessing said look-up table to maintain accesses within said look-up table.

11. A method for generating at least two different frequency sine waves as claimed in claim 7 further comprising the steps of:
 setting said first frequency to 1200 hertz; and
 setting said second sampling frequency to 8000 hertz.

12. A method for generating at least two different frequency sine waves as claimed in claim 11 further comprising the steps of:
 setting a first table step of 18 for a sine wave of 1200 hertz; and
 setting a second table step of 33 for a sine wave of 2200 hertz.

13. A method for generating at least two different frequency sine waves for transmission at a first frequency from a look-up table having entries including samples taken at a second sampling frequency which is not an integral multiple of said first frequency, said method comprising the steps of:
 selecting a fundamental table frequency such that the frequencies of said different frequency sine waves to be generated are each an integral multiple of said fundamental table frequency;
 determining a fractional correction factor by:
  placing said second sampling frequency over said first frequency to form a fraction; and
  reducing said fraction;
 forming a look-up table for a sine wave of said fundamental table frequency by taking samples at a rate equal to said second sampling frequency times a denominator of said fractional correction factor;
 accessing said look-up table using at least two different table steps corresponding to said at least two different frequency sine waves to be generated; and
 taking first and second fractional portions of two table steps occurring on either side of transmission transition points defined by said first frequency, said first and second fractional portions summing to one.

14. A method for generating at least two different frequency sine waves as claimed in claim 13 further comprising the steps of:
 determining a new fundamental table frequency by multiplying said fundamental table frequency by said denominator of said fractional correction factor; and
 determining said at least two different table steps based on said new fundamental table frequency.

15. A method for generating at least two different frequency sine waves as claimed in claim 14 wherein said step of determining said at least two different table steps comprises the step of dividing frequencies of said at least two different frequency sine waves by said new fundamental table frequency.

16. A method for generating at least two different frequency sine waves as claimed in claim 13 further comprising the steps of:
 limiting said look-up table to samples corresponding to one sine wave of said fundamental table frequency; and
 circulating said step of accessing said look-up table to maintain accesses within said look-up table.

17. A method for generating at least two different frequency sine waves as claimed in claim 13 further comprising the steps of:
 setting said first frequency to 1200 hertz; and
 setting said second sampling frequency to 8000 hertz.

18. A method for generating at least two different frequency sine waves as claimed in claim 17 further comprising the steps of:
 setting a first table step of 18 for a sine wave of 1200 hertz; and
 setting a second table step of 33 for a sine wave of 2200 hertz.

* * * * *